(12) United States Patent
Wellen

(10) Patent No.: US 11,002,999 B2
(45) Date of Patent: May 11, 2021

(54) AUTOMATIC DISPLAY ADJUSTMENT BASED ON VIEWING ANGLE

(71) Applicant: Microsoft Technology Licensing, LLC, Redmond, WA (US)

(72) Inventor: William Murdock Wellen, Carnation, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 29 days.

(21) Appl. No.: 16/459,061

(22) Filed: Jul. 1, 2019

(65) Prior Publication Data
US 2021/0003869 A1 Jan. 7, 2021

(51) Int. Cl.
*G02F 1/13* (2006.01)
*G06F 1/16* (2006.01)

(52) U.S. Cl.
CPC .......... *G02F 1/1323* (2013.01); *G06F 1/1601* (2013.01)

(58) Field of Classification Search
CPC ............................. G02F 1/1323; G06F 1/1601
See application file for complete search history.

(56) References Cited

U.S. PATENT DOCUMENTS

| | | | |
|---|---|---|---|
| 9,075,429 B1 | 7/2015 | Karakotsios | |
| 2014/0318028 A1* | 10/2014 | Anderson | E04H 3/30 52/8 |
| 2015/0085076 A1 | 3/2015 | Lockhart et al. | |
| 2015/0177906 A1* | 6/2015 | Yairi | G06F 3/016 345/648 |
| 2017/0228138 A1* | 8/2017 | Paluka | G06F 3/04845 |
| 2018/0089821 A1* | 3/2018 | Koldyshev | H04M 1/0202 |
| 2018/0180441 A1* | 6/2018 | Mizuochi | G01C 22/006 |
| 2019/0075201 A1* | 3/2019 | Tu | H04M 1/72569 |
| 2019/0124309 A1* | 4/2019 | Ichieda | H04N 9/3194 |

OTHER PUBLICATIONS

Perspective Correction Methods for Camera-Based Document Analysis; Jagannathan, et al., Proceedings of the First International Workshop on Camera-Based Document Analysis Recognition (CBDAR 2005). Aug. 29, 2005. pp. 148-154.
Efficiently Building a Matrix to Rotate One Vector to Another; Moller, et al., Journal of Graphics Tools vol. 4, 1999—Issue 4. Jun. 1999, revision Dec. 1999. pp. 1-4.

(Continued)

*Primary Examiner* — Grace Q Li
(74) *Attorney, Agent, or Firm* — Medley, Behrens & Lewis, LLC

(57) ABSTRACT

Described herein is a mechanism for automatically correcting perspective of displayed information based on the orientation of the display device. A user can identify a screen orientation where the displayed information does not need perspective correction. The system can monitor changes to the display orientation, and when the orientation changes, the system can measure the distance to a user's eye or calculate the distance based on measured data. Based on the distance, a correction factor can be calculated. An area in the display where corrected information will be displayed is identified. The currently displayed information is corrected based on the correction factor and displayed in the identified display area.

20 Claims, 12 Drawing Sheets

(56) References Cited

OTHER PUBLICATIONS

Projective Mappings for Image Warping; Heckbert, excerpted of Fundamentals of Texture Mapping and Image Warping, Paul Heckbert, Master's thesis, UCB/CSD 89/516, CS Division, U.C. Berkeley, Jun. 1989. pp. 17-21.
"International Search Report and Written Opinion Issued in PCT Application No. PCT/US2020/033669", dated Jul. 28, 2020, 12 Pages.

* cited by examiner

AUTOMATIC DISPLAY ADJUSTMENT BASED ON VIEWING ANGLE

FIELD

This application relates generally to adjustment of displayed information based on viewing angle. More specifically, this application relates to improvements in display of information so that the size and shape of displayed information is automatically adjusted based on viewing angle.

BACKGROUND

Portability in computing and display systems has provided several benefits and allows users to work wherever they happen to be. However, this creates environments that are less than ergonomic. In such environments, current display screens have perspective failure when a user is unable to adjust the display to be exactly perpendicular to the user's eyes. Such perspective failure can be exacerbated when display devices are mounted to wheelchairs or other similar environments.

It is within this context that the present embodiments arise.

DETAILED DESCRIPTION

Figure 1:
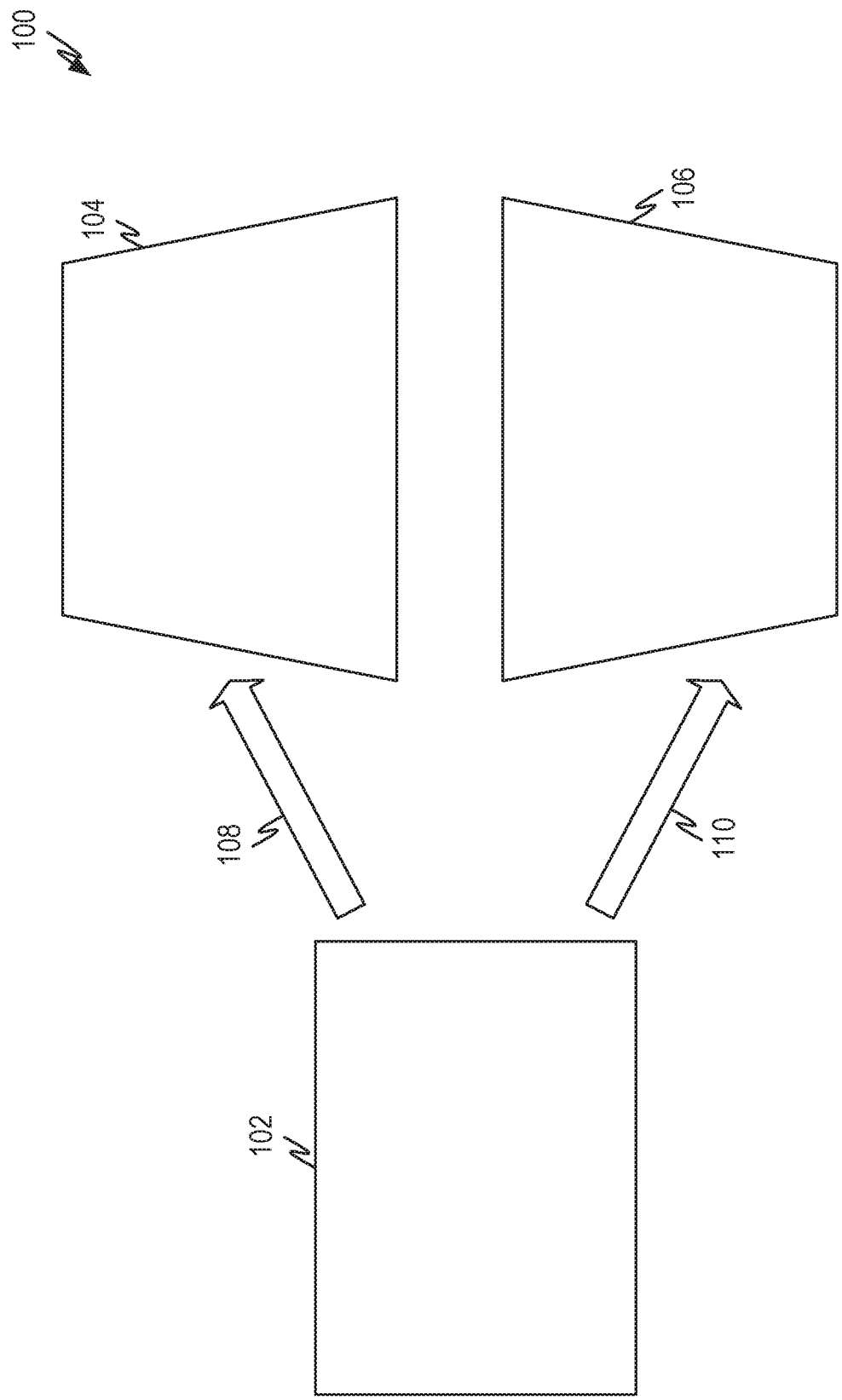
FIG. 1 illustrates an example of what happens when a display is tilted toward or away from a user.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

The following overview is provided to introduce a selection of concepts in a simplified form that are further described below in the Description. This overview is not intended to identify key features or essential features of the claimed subject matter, nor is it intended to be used to limit the scope of the claimed subject matter. Its sole purpose is to present some concepts in a simplified form as a prelude to the more detailed description that is presented later.

Although the portability in computing devices has let users take powerful computational capability with them and work in virtually any location, the portability in computing devices has also created issues for users to deal with. For example, many environments do not have comfortable space to work in. Anyone who has tried to utilize a laptop while flying coach class on an airplane has encountered an environment where the laptop screen can neither be placed at a comfortable viewing distance nor at a comfortable viewing angle. Such viewing angles cause skewed perspectives when viewing information on the display of the device.

In other environments, where display devices are mounted is dictated by user reach, space, or other such considerations. For example, computing devices have allowed those with minimal physical mobility or who have difficulty speaking to engage more fully. However, in such situations, display devices must usually be mounted close to the user, and at orientations that can induce significant perspective distortion when the user views information on display.

Finally, there may be many reasons why a user adjusts a display screen in a manner that introduces perspective distortion. For example, orienting the screen at an angle that minimizes perspective distortion may introduce other undesirable effects, such as screen glare from external lighting sources (the sun, studio lighting, overhead lights, and so forth). In such a situation, the user may prefer the perspective distortion to the other effects.

Perspective distortion happens when a user views a display at non-normal angles. In other words, when the user's eyes are not parallel to the plane of the display. A normal viewing angle is a viewing angle where the user's sight line is parallel to a vector normal to the plane of the display device. The larger the user's viewing angle departs from a normal viewing angle, the larger the perspective distortion becomes.

Some devices, such as laptops or external screens mounted on some types of mounting systems allow a user to adjust the orientation (tilt angle, rotation, and so forth) of the display on the device so users can manually adjust the orientation of the screen to minimize perspective distortion, place the screen in the center of a user's field of view, place the screen at a comfortable viewing distance, and so forth. However, such a manual adjustment does not help if the environment does not allow the orientation angle to be adjusted to an angle that minimizes perceived perspective distortion. Similarly, where orientation is dictated by other factors, such as attachment to a wheelchair or other mobility device in a location where the display can easily be reached.

Some devices are constructed in a manner to try to mitigate perspective distortion. For example, the so called "widescreen" monitors are often curved so that a user viewing them at a comfortable distance will have minimal perspective distortion at the edges of the wide screen. However, such attempts are not adjustable and require the user to position the display and/or the user in a location where the curvature can be effectively utilized.

Projective displays have long had manual perspective correction to correct for perspective distortion introduced because the projective device is not normal to the reflective screen on which the projection is displayed. However, there currently does not exist any mechanism for correcting for perspective distortion introduced by non-normal viewing angles for non-projective displays.

Embodiments of the present disclosure allow users to identify display orientations that minimize perceived perspective distortion and then automatically correct the displayed information to mitigate perspective distortion based on changes in orientation away from the identified orientation. Sensors can measure the orientation of the screen relative to the user and detect changes away from the orientation that minimizes perceived perspective. The changes can identify a set of parameters that describe the relative orientation and correction factors are calculated based on one or more parameters in the set. As used herein, a set of parameters includes one or more parameters. As used herein orientation changes can include changes introduced by movement of the user, the display, or both.

Changes in relative orientation (sometimes shortened to simply orientation) can be detected by monitoring changes in the set of parameters. When one or more parameters change by more than a threshold amount, the system can initiate correction of perspective distortion.

Depending on the type of sensors used to measure relative orientation, changes in one or more planes can be detected and corrected.

Description

In the following description, reference is made to a user's eyes. Such a reference includes a user with only one functioning eye as well as a user with two functioning eyes. Similarly, gaze ray refers to a vector originating at user's functioning eye or from the center of a user's eyes as the case may be. Gaze angle (also referred to as viewing angle) refers to an angle that the gaze ray makes with the screen. A model of a user's vision that is often used is to utilize the distance to the center of the user's eyes, in the case where a user has two functioning eyes, or to the user's functioning eye, in the case where a user only has one functioning eye. Thus, distance to the user can refer to distance to the center of user's eyes or the distance to the user's functioning eye, as the case may be.

FIG. 1 illustrates an example 100 of what happens when a display is tilted toward or away from a user. When a user views a display at a normal viewing angle or close to a normal viewing angle, there is no or little perspective distortion that can be perceived by a user. This is illustrated by 102 in FIG. 1. A normal viewing angle is where the viewing angle of the user is parallel to, or coincident with a vector normal to the plane of the display. The principles of the present disclosure can be applied to curved or non-flat displays with appropriate modification of the teachings herein. However, to make the explanation of the principles herein more clear, flat displays are used as representative examples.

Perspective distortion is introduced by a change in relative orientation of the display and the user. This change can be induced by movement of the screen, the user, or both. However, since all motion is relative, the description of changes in orientation will be described in the context of movement of the display or changes in the orientation of display, with the understanding that an equivalent change can also be induced by movement of the user. Thus, sensors that sense movement of the user, movement of the display, or both can be used to detect changes in relative orientation. From this point on in the disclosure, changes in orientation will be described as changes in orientation of the display and the notion of "relative" change will be encompassed within such a discussion.

When the top of the display is moved farther away from the user, the change 108 happens and the top of the screen appears smaller to the user because change in the distance. Example perspective distortion introduced by such a change in a single plane is illustrated by 104. When the top of the display is moved closer to the user, the change 110 happens and the top of the screen appears larger to the user because of the change in the distance. Example perspective distortion introduced by such a change in a single plane is illustrated by 106.

This is a simple illustration of the perspective distortion introduced by a change in a single plane (rotation around a single axis). More complex perspective distortion is introduced with changes in multiple planes (rotation around multiple axes).

Figure 2:
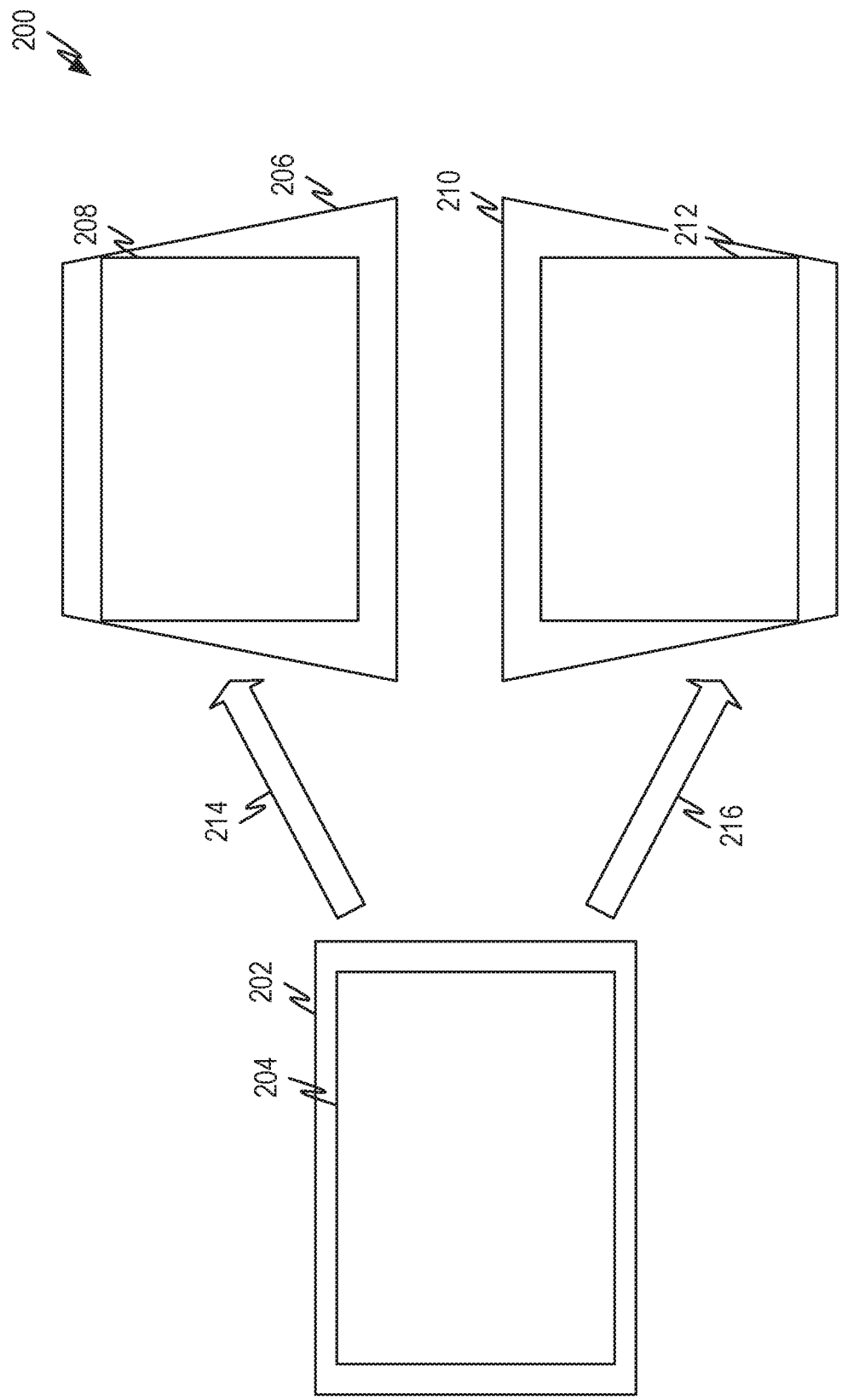
FIG. 2 illustrates an example of displayed information on a tilted screen according to some aspects of the present disclosure.

FIG. 2 illustrates an example 200 of displayed information on a tilted screen according to some aspects of the present disclosure. When viewed at a normal viewing angle (e.g., viewing angle parallel to or coincident with a normal vector of the display 202), the information displayed 204 shows little or no perspective distortion. The embodiments of the present disclosure automatically adjust displayed information on the screen to mitigate perspective distortion. Using the orientation changes of FIG. 1 as examples, when the distance from the user to the top of the display increases and/or distance from the user to the bottom of the display decreases 214, perspective distortion such as illustrated by 206 is introduced.

The embodiments of the present disclosure compensate for this perspective distortion by calculating and applying one or more correction factors such as described herein. In this case, perspective distortion is mitigated by increasing the width of information at the top of the display and/or decreasing the width of information at the bottom of the screen in a proportional manner based on the distance from the user (specifically the user's eye(s)) to the location on the screen. Making such a correction results in information that is displayed so that it looks the same as or similar to the information when viewed at a normal viewing angle as illustrated by 208.

The limits of the display set how much information can be displayed and adjustments can be made based on the limits of the display. For example, suppose that to correct for the perspective distortion, information at the top of the screen should be enlarged in the horizontal direction by a factor that results in information falling off the sides of the display. In this case, the system can make one or more corrections based on the display limits. In one embodiment, the information can be moved "down" on the screen until there is sufficient width to display the information. In this case, the top of the screen may not be used. In another embodiment, the width of the display screen is used to set the maximum magnification correction. Scaling for the remainder of the screen is reduced proportionally so that the information is still presented with little or no perspective distortion. However, the information will be displayed at a smaller size than it would otherwise be displayed if there were more screen width. In still another embodiment, the display area 208 becomes a "viewport" through which fully scaled information is displayed. In this situation, the information can be scrolled in the viewport so that all information can be seen, if not simultaneously.

When the distance from the user to the top of the display increases and/or distance from the user to the bottom of the display decreases 216, perspective distortion such as illustrated by 210 is introduced. The perspective distortion can be corrected *mutatis mutandis* as described above for the perspective distortion 206.

Figure 3:
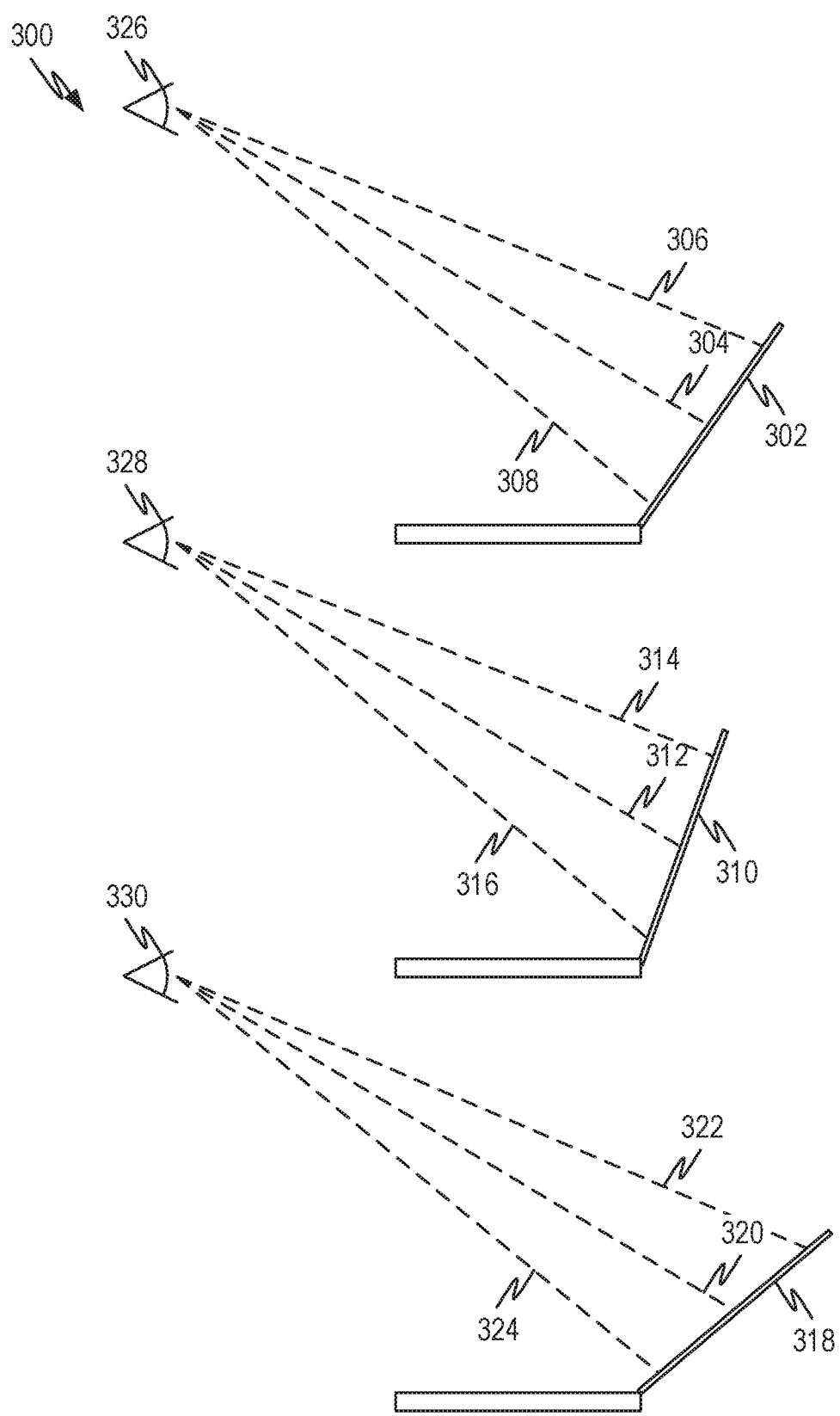
FIG. 3 illustrates example geometries for displayed information on a tilted screen according to some aspects of the present disclosure.

FIG. 3 illustrates example geometries 300 for displayed information on a tilted screen according to some aspects of the present disclosure. These are, for example, representative of the type of geometries that may be encountered when a user uses a laptop or slate computer that sits on a surface below the user's eyes (e.g., 326, 328, 330). If the user is in an appropriate environment, the tilt of the screen 302 can be adjusted until the user gaze angle is normal to the screen 302.

Because of the tilt of the screen 302, the question becomes where should the user gaze angle be measured from in order to achieve a gaze angle normal to the screen 302 that minimizes perspective distortion. A reasonable model of the user's gaze is to model it as if it originates at a point in space. Minimization of perspective distortion occurs when a line drawn from that point to the center of the screen 302 is normal to the screen 302. This is illustrated by gaze ray 304. When this condition is met, a point on the screen as the gaze angle moves away from the center has the same distance as a corresponding point on the other side of the center of the screen. Thus, the distance along gaze ray 306 from the screen 302 to the user's eyes 326 is the same as the distance along gaze ray 308 from the screen 302 to the user's eyes 326, when gaze ray 306 and gaze ray 308 are the same distance from the center of the screen. This is true independent of the plane that contains gaze ray 306 and gaze ray 308.

If the top of the screen 310 tilts toward the user 328, the distances along equivalent gaze rays 312, 314, 316 change. How they change depends on the axis of rotation of the screen 310. In the illustrated figure, the screen is rotated about an axis extending along the bottom of the screen 310, such as might be expected by a laptop with the screen hinged along the edge, or a slate with the bottom edge placed on a supporting surface.

In the illustrated geometry, the top of the screen 310 moves the most thus the distance along gaze ray 314 changes more than the distance along gaze ray 312 or gaze ray 316. In addition, the distance along gaze ray 314 no longer is the same as the distance along gaze ray 316.

Similarly, if the top of the screen 318 tilts away from the user 330, the distances along equivalent gaze rays 322, 320, 324 change. How they change again depends on the axis of rotation of the screen 318. In the illustrated figure, the screen is again rotated about an axis extending along the bottom of the screen 318, such as might be expected by a laptop with the screen hinged along the edge, or a slate with the bottom edge placed on a supporting surface.

In the illustrated geometry, the top of the screen 318 moves the most thus the distance along gaze ray 322 changes more than the distance along gaze ray 320 or gaze ray 324. In addition, the distance along gaze ray 322 no longer is the same as the distance along gaze ray 324.

Differences in the axis of rotation will change how the distances along the different gaze rays change relative to each other as rotation occurs, but the principles are the same. Similarly, as discussed above, equivalent changes can be realized by the user (326, 328, 330) moving instead of tilting the screen. However, all such user motions can be described by considering an equivalent tilt of the screen. Thus, examples presented herein are characterized by a change in screen tilt, with the understanding that the screen tilt also encompasses user motion.

The distance changes along one or more gaze rays can be measured and used to correct perspective distortion introduced by the change in screen tilt as described herein. Thus, embodiments of the present disclosure utilize sensors to measure distance or measure parameters from which distance can be calculated. Suitable sensors are discussed below.

Although tilt in a single plane is used as an example for FIG. 3, correction for tilting in multiple planes can also be corrected by extending the concepts described in this example to multiple planes.

Figure 4:
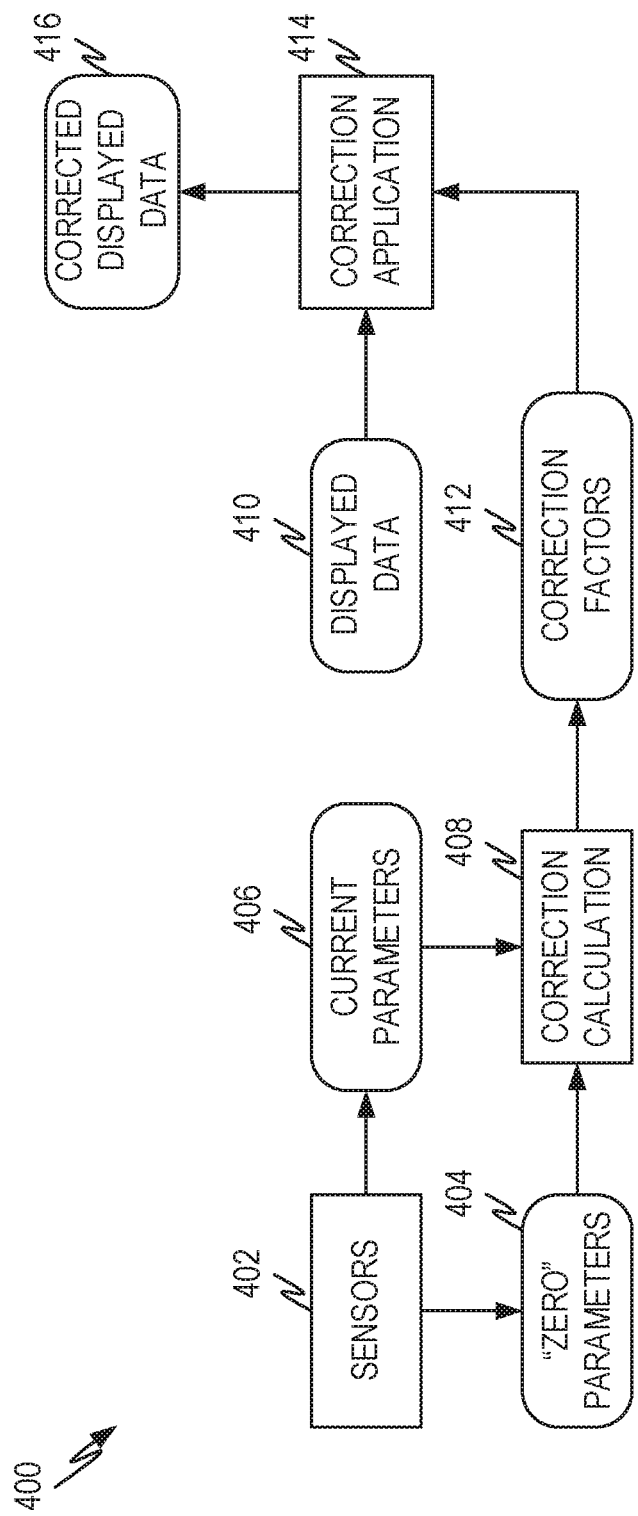
FIG. 4 illustrates an example architecture according to some aspects of the present disclosure.

FIG. 4 illustrates an example architecture 400 according to some aspects of the present disclosure. The architecture diagram depicts the information and functions performed by embodiments of the present disclosure to automatically correct for perspective distortion.

In some embodiments, the system gathers a set of parameters that define screen orientation where perspective distortion is minimized and/or not perceived by the user. These parameters are represented by the "zero" parameters 404 (also referred to as initial parameters). The set of zero parameters describe the orientation of the screen where a user's gaze ray to the center of the display produces little or no perspective distortion.

The zero parameters can be gathered through a calibration or similar process, if desired. For example, when the set of zero parameters needs to be captured, the user can be prompted to set the screen where perspective distortion is minimized. Additionally, or alternatively, the user can be prompted to initiate capture of current parameters. Additionally, or alternatively, the user can be prompted to enter information that allows the system to calculate an orientation where the perspective distortion is minimized. For example, if the user is unable to place the screen in an orientation that minimizes perspective distortion (e.g., because the environment will not allow the screen to be placed in that orientation), the user can be presented with a set of controls that allows the user to adjust what is displayed until distortion is minimized. The corrections entered along with measured parameters in some instances, can allow the system to calculate the set of zero parameters.

The set of zero parameters can be directly measured, can be calculated from measured values, and/or some combination thereof. Measurement occurs, for example, via one or more sensors 402. The sensors 402 can comprise sensors that measure parameters related to the device, such as screen tilt angle relative to a reference (e.g., vertical, closed position, fully open, etc.), can be sensors that measure parameters related to a user, or any combination thereof. For example, screen tilt angle can be measured by an angle encoder built into the hinge of a laptop or other device where a screen can be pivoted around a hinge. Where a screen is mounted in a manner that allows pivoting in multiple planes, encoders can be placed on the axes of rotation. Additionally, or alternatively, accelerometers can measure the axial tilt relative to a reference such as a gravity vector, and/or can measure the speed and direction of motion so that the angular tilt of the screen can be derived by knowing a starting location as well as speed, direction, and time of motion.

Parameters relative to the user can be measured by bouncing signals off the user or by receiving signals from a device positioned on a user. For example, cameras (infrared, or other) can be used to capture images of the user, the user's eyes, reflections from eyes, and so forth from which parameters related to the user can be measured or derived. A common example of such sensors is an eye tracking system. The eye tracking systems typically rely on an infrared laser to create reflections from a user's eye and an infrared camera to capture the reflections. The eye tracking systems use the information to calculate the gaze angle of the user to identify where on the screen a user is looking. Sometimes such systems can measure not only gaze angle, but distance to a user's eyes as well. Acoustic, lidar, optical, and other such technologies can also be used to obtain such measurements, either alone or in conjunction with other forms of sensors. These measurements can be used to determine screen orientation, user location relative to the screen, and so forth.

In examples used in this disclosure, the parameters that are utilized to characterize screen orientation are distance and/or gaze angle from the screen to the user's eyes. However, any parameters that can be used to determine relative orientation between the user and the screen can be used.

Once the set of zero parameters 404 are captured/calculated, the system (e.g., using correction calculation process) can monitor a set of current parameters 406 to identify changes from the set of zero parameters 404. When the set of current parameters 406 differs from the set of zero parameters 404 by more than a threshold amount, the system can calculate one or more correction factors 412 that can be applied to displayed data 410 in order to correct perspective distortion. As an example, the distance from the user's eye to one or more locations on the screen can be monitored and when the distance changes by more than a threshold amount, the system can calculate one or more correction factors 412. In this embodiment the threshold may not be the same for every location on the screen, so that the threshold varies depending on various factors. For example, in a system where the screen is hinged, the portion of the screen closest to the hinge may be expected to travel less distance when the screen is rotated than a portion of the screen farther away from the hinge. Thus, locations on the screen closer to the hinge may have lower thresholds than locations on the screen farther away from the hinge in some embodiments. In other embodiments, the same threshold may be used for the entire screen.

In still other embodiments, gaze angle associated with one or more locations on the screen can be monitored and when the gaze angle associated with one or more locations on the screen changes by more than a threshold amount, the correction factor(s) 412 can be calculated and applied. As in the embodiment where distance is monitored, the threshold for gaze angle can be dependent on the location of the screen or can be the same for all locations on the screen.

In still other embodiments, a combination of distance and/or gaze angle can be monitored and used to trigger correction.

Correction application process 414 applies the one or more correction factors 412 to the displayed data 410 to obtain corrected displayed data 416.

The methods of calculating the set of correction factors 412 and applying the set of correction factors 412 by the correction application method 414 are described in greater detail below.

Figure 5:
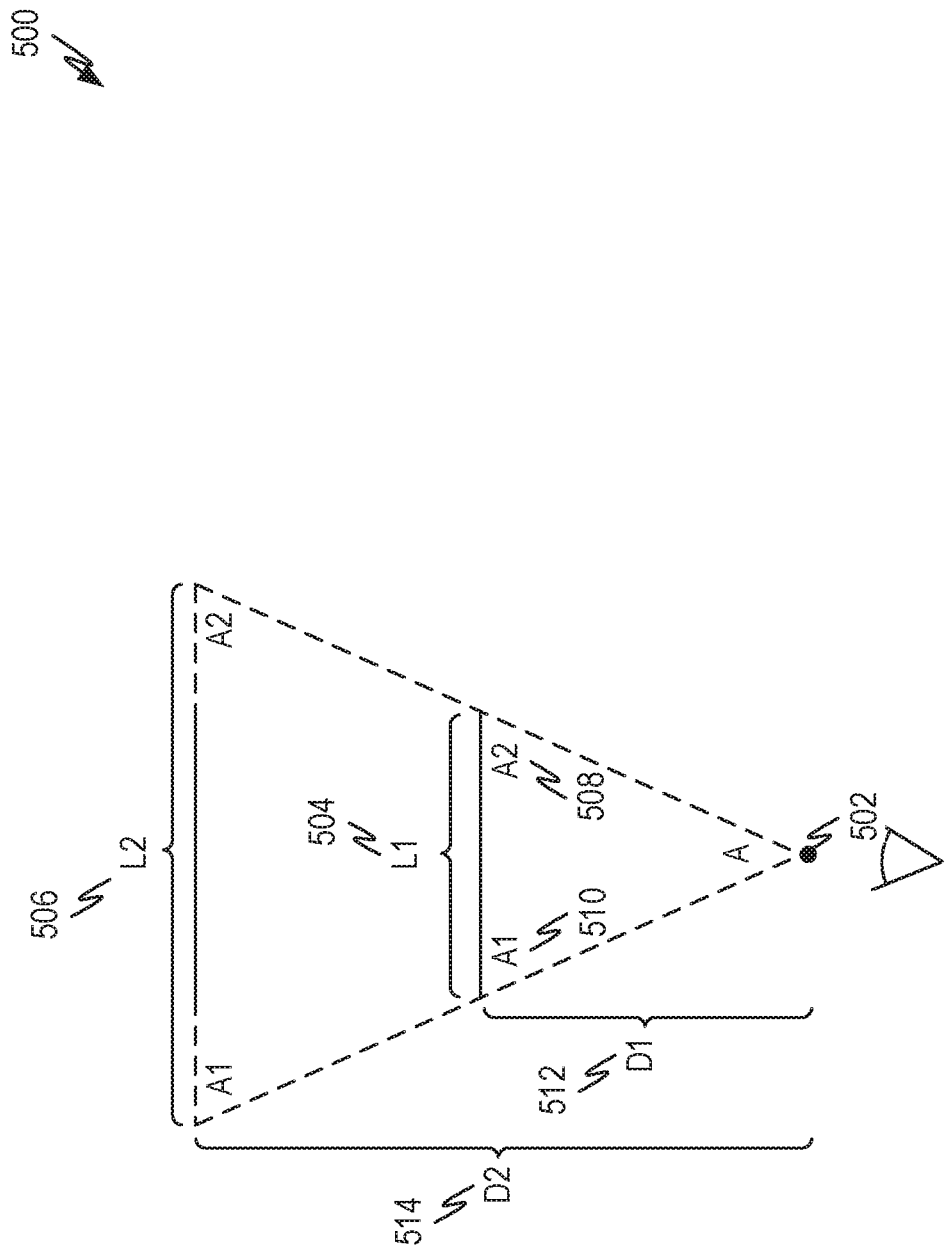
FIG. 5 illustrates an example distance scaling approach according to some aspects of the present disclosure.

FIG. 5 illustrates an example 500 distance scaling approach according to some aspects of the present disclosure. Referring back to FIG. 2 for a moment, the figure shows that when the top of a screen moves away from a user and/or the bottom is moved closer to the user (214, 206), information at the top of the screen needs to be increased in size and/or information at the bottom of the screen needs to be reduced in order to correct perspective distortion. FIG. 5 addresses the issue of how much something needs to be increased and/or decreased as the distance increases and/or decreases.

With no perspective distortion, when a user's eye 502 is located a distance $D_1$ 512 from an item that has a length Li 504, the item subtends an angle where a triangle formed by the user's eye 502 is an equilateral triangle with two equal angles $A_1$ 510 and $A_2$ 508.

The tangent of the angle subtended by the user's eye is given by:

$$\tan A = \frac{L_1}{2} \cdot \frac{1}{D_1} \qquad (1)$$

As the distance increases from $D_1$ 512 to a second distance $D_2$ 514, to remove the perspective distortion, the angle subtended by the user's eye 502 should be the same. Thus, we have:

$$\tan A = \frac{L_2}{2} \cdot \frac{1}{D_2} \qquad (2)$$

This means:

$$L_2 = \frac{D_2}{D_1} L_1 \qquad (3)$$

Thus, the ratio of the distances gives the factor that a given item must be either magnified or reduced to remove perspective distortion. Thus, as the distance to a portion of the screen either increases or decreases, the ratio of the distance can be used as the factor to increase and/or decrease information on screen to remove perspective distortion. For systems that can directly measure distance to a user's eye, this allows correction factors to be directly calculated from measured information and applied.

The correction factor can be applied in any portion of the screen where distance changes from its zero distance by more than a threshold amount as described herein. To simplify application, the correction factor can be held constant across a small region of the screen where all distances within a given range have the same correction factor.

Figure 6:
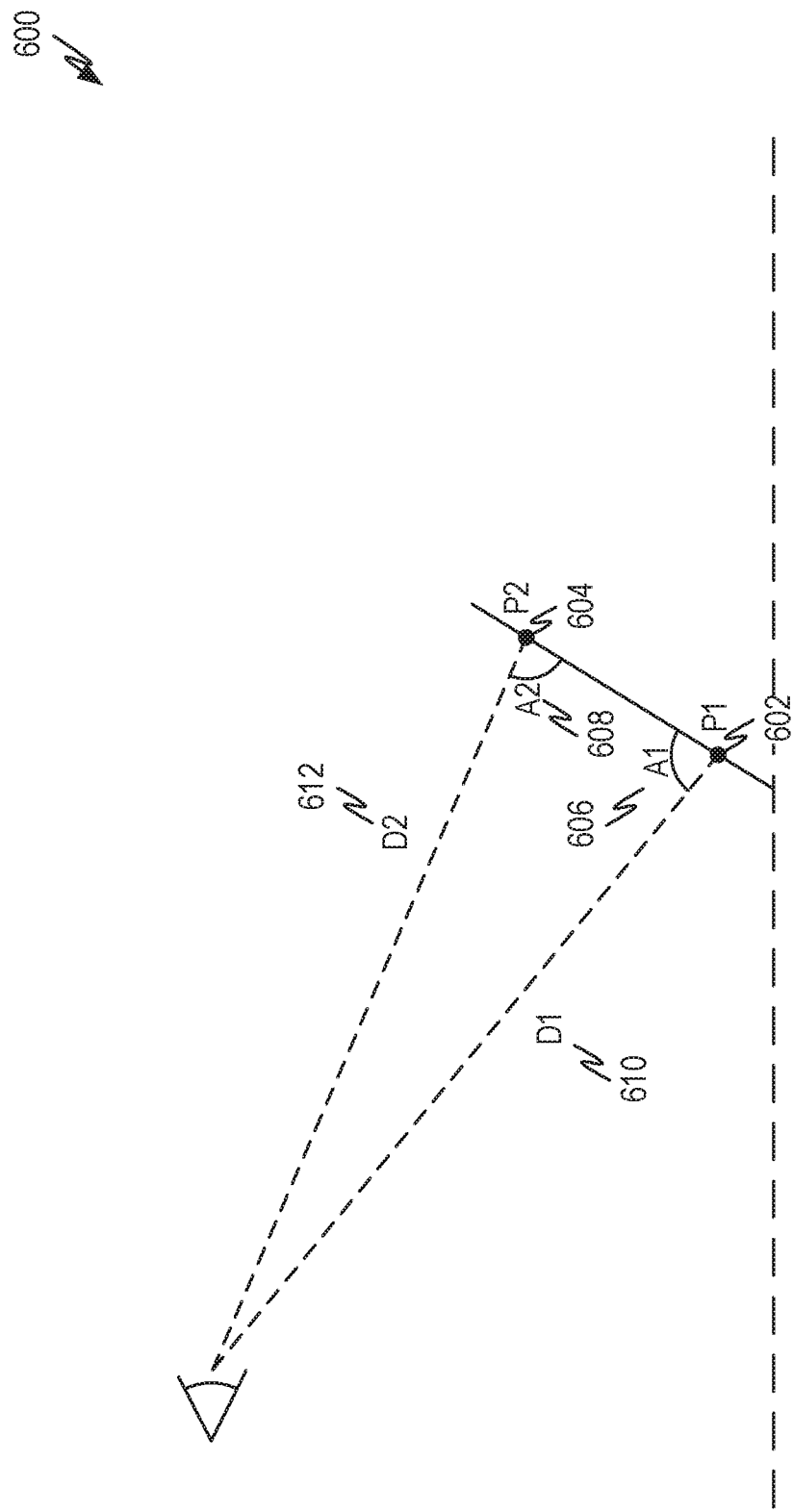
FIG. 6 illustrates an example baseline location for a tilted screen according to some aspects of the present disclosure.

When distances cannot be measured directly, the correction factor can be calculated based on measured parameters. For example, FIG. 6 illustrates an example 600 baseline location for a tilted screen according to some aspects of the present disclosure. This can represent, for example, the zero position of a tilted laptop or slate screen. As discussed above, when the viewing angle from the user's eye to the screen is normal to the center of the screen, then the distance along the viewing angles to the top and bottom of the screen are the same. Thus, in FIG. 6, the bottom of the screen is represented by point $P_1$ 602 and the top of the screen is represented by point $P_2$ 604. Since the middle of the screen is normal to the user's eye gaze ray, the angle $A_1$ 606 is equal to the angle $A_2$ 608 and the distance $D_1$ 610 is equal to the distance $D_2$ 612.

Figure 7:
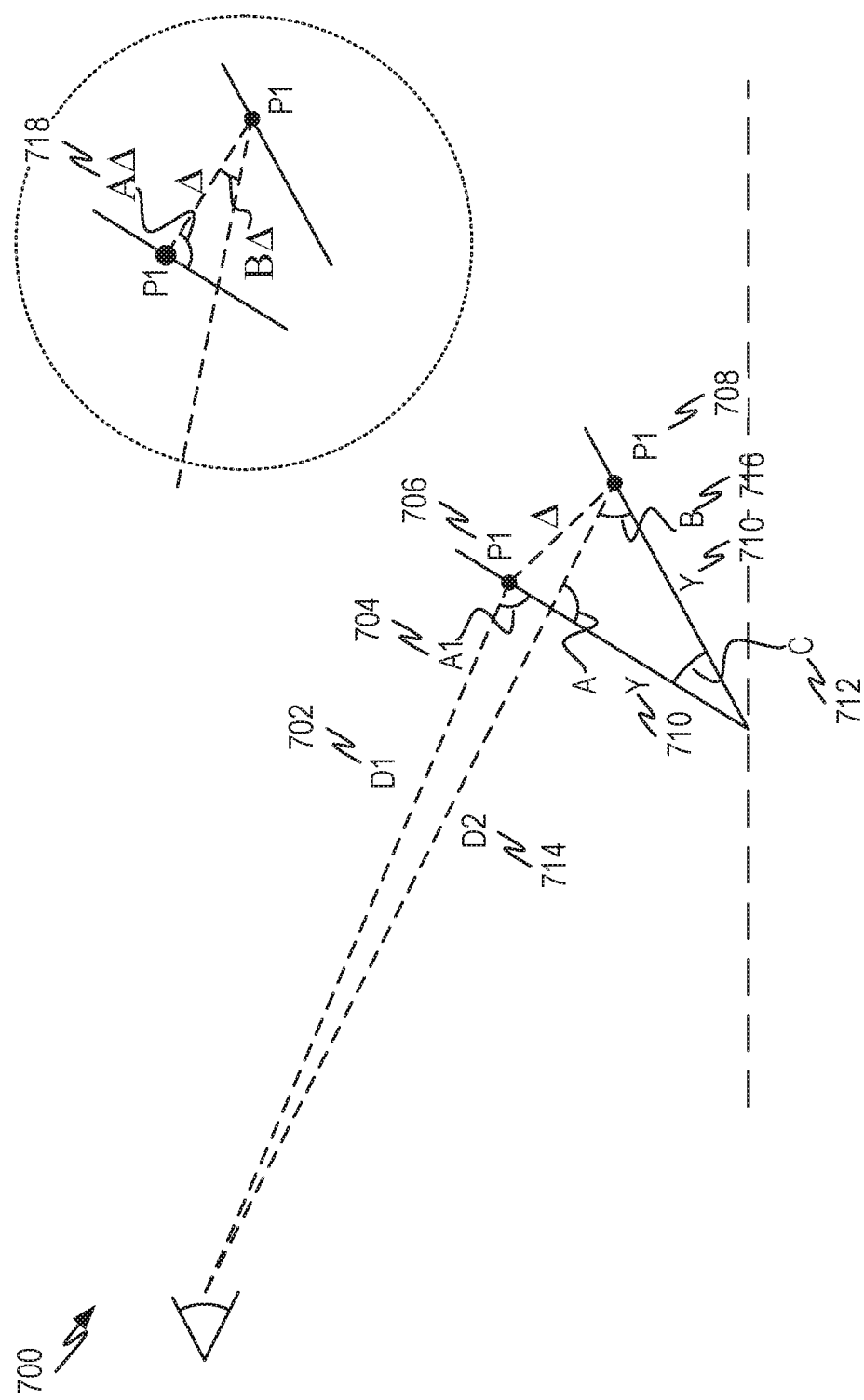
FIG. 7 illustrates an example distance calculation for a tilted screen according to some aspects of the present disclosure.

If the screen is tilted, FIG. 7 shows how the geometry changes. FIG. 7 illustrates an example 700 distance calculation for a tilted screen according to some aspects of the present disclosure. In this situation, let point $P_1$ 706 be a point on the screen that lies a distance Y 710 from the place where the screen will be pivoted. The point lies a distance $D_1$ 702 from the user's eye and the gaze angle of the user is angle $A_1$ 704. These represent the initial or zero parameters of the screen orientation.

If the screen is rotated by an angle C 712, the question is what is the new distance $D_2$ 714 to the point $P_1$ 708. The distance $D_2$ 714 can be calculated in a variety of ways. Assuming the system can measure the gaze angle B and the angle of rotation C 712 and knows the initial parameters, $D_1$ 702, $A_1$ 704, Y 710, then one formulation of the new distance $D_2$ 714 is given by:

$$D_2 = \sqrt{D_1^2 + \Delta^2 - 2D_1\Delta\cos(A1 + A_\Delta)} \quad (4)$$

$$\Delta = \sqrt{2Y^2 - 2Y^2\cos(C)} = 2Y\sin\left(\frac{C}{2}\right) \quad (5)$$

$$A_\Delta = 90° - \frac{C}{2} \quad (6)$$

The angle $A_\Delta$ 718 is shown in the enlarged portion of FIG. 7 and the other referenced parameters are as illustrated in the figure. Other formulations for distance are available.

As discussed, the system can also use gaze angle to a portion of the screen in addition to, or as an alternative to, distance to the user. Many eye tracking systems can measure gaze angle. Thus, the angle $A_1$ 710 can be measured directly or calculated from eye tracking systems if the gaze angle is not directly measured. When the screen rotates by an angle C 712, the new eye gaze angle B 716 can be measured and/or calculated. If the original angle $A_1$ 704 and distance $D_1$ 702 is known, B is related to the rotation angle C 712 by:

$$B = 90° - \frac{C}{2} - B_\Delta \quad (7)$$

$$B_\Delta = \sin^{-1}\left(\frac{D1}{\Delta}\sin(A_1 + A_\Delta)\right) \quad (8)$$

And Δ is given by equation (5) and $A_\Delta$ is given by equation (6).

What FIG. 7 shows, in addition to the fact that distance to a user can be calculated from the measured parameters, is that rotation angles can also be calculated or measured and that distance, rotation angle, or a combination thereof can be used to trigger both calculation of correction factors and perspective correction itself.

Figure 8:
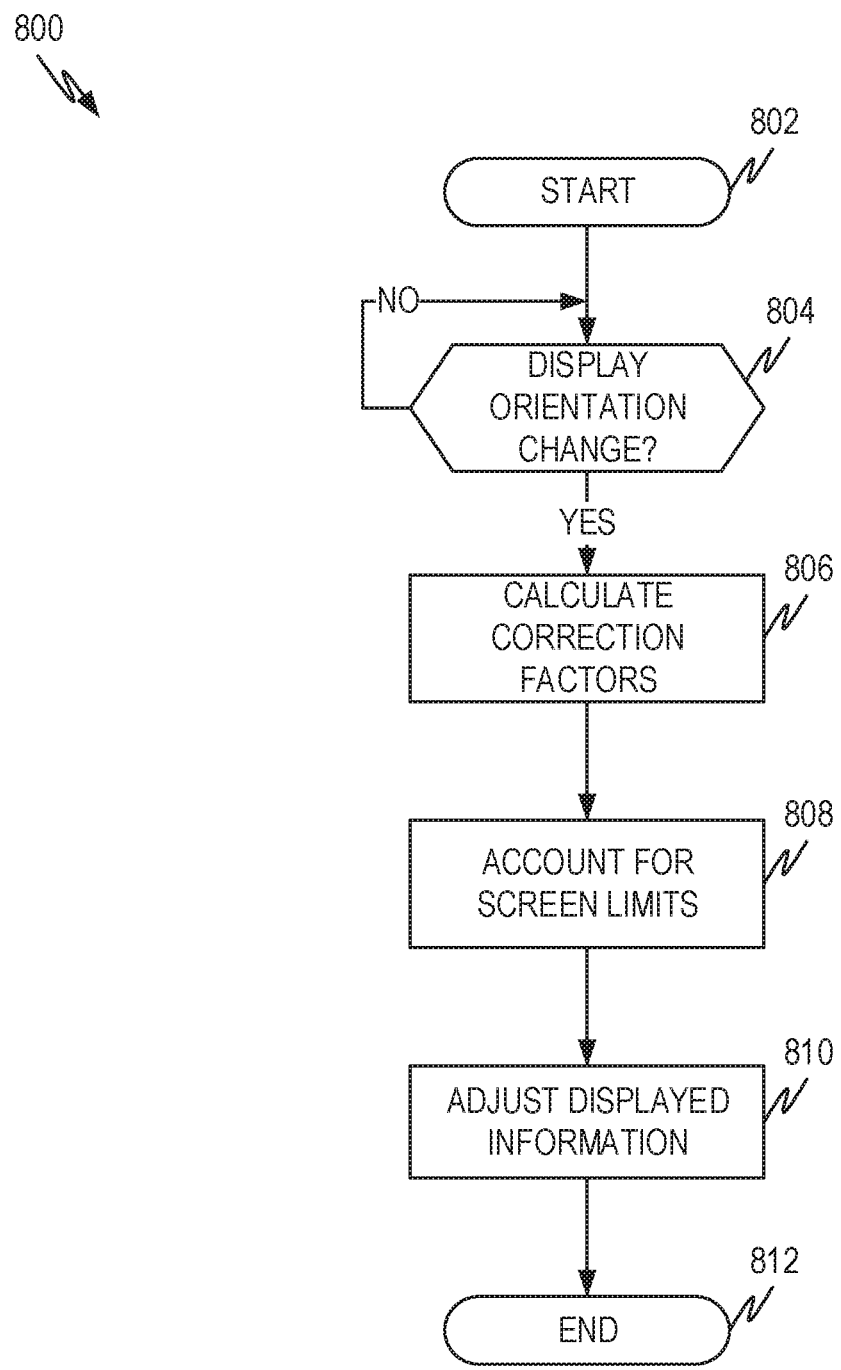
FIG. 8 illustrates an example method for display information correction according to some aspects of the present disclosure.

FIG. 8 illustrates an example method 800 for display information correction according to some aspects of the present disclosure. The method begins at operation 802 and proceeds to operation 804 where changes to display orientation are monitored. Changes in display angle orientation can be determined by monitoring the distance between the user and the display, by monitoring the gaze angle, or both as previously described. Once initial distances and/or gaze angle are measured between the user and one or more locations on the screen, these values can be monitored and when the difference between a current value and an initial value for one or more distances and/or gaze angles changes by more than a threshold amount, the system can determine that the display orientation has changed. The threshold(s) can be dependent on the screen location as discussed herein.

The use of distance and/or gaze angle to measure changes in display orientation has the benefit of measuring relative orientation between the display and the user. Thus, in situations where the user moves but the absolute screen orientation does not, the system will still detect a change in relative screen orientation. However, some embodiments can utilize absolute screen orientation in place of relative screen orientation. In these embodiments, sensors, such as one or more accelerometers can measure the absolute screen orientation relative to a reference such as a gravity vector. If a zero orientation (i.e., an orientation where information presented to the user has little or no perceived perspective distortion) is known, then changes to the display orientation and/or location of the display can be used to trigger perspective distortion correction. In these situations, distances and/or angles used for calculating one or more correction factors can be the changes in distances and/or changes in angles. Given the disclosure herein, those of skill in the art will be able to derive the correction factors without undue experimentation.

Once changes in the display orientation are detected, execution proceeds to operation 806 where the correction factors are calculated. For example, changes in distance can be used to calculate a scaling factor, such as given by equation (3).

In operation 808 the screen limitations are accounted for. As discussed above, when the information is enlarged on the screen, it may overflow the physical limits of the screen. If this will be the case, then some accommodation for the physical limits of the screen need to be made. As discussed above, this can include one or more of: adjusting the location on the screen where the scaled information is displayed, adjusting the scaling of the information so that it is displayed at a smaller non-distorted size, and/or turning the area where the information will be displayed into a viewport where the information can be scrolled so all the information can be seen.

In operation 810, the adjusted information is displayed or is caused to be displayed, depending on how the system accomplishes the display of information.

The method ends at operation 812.

Figure 9:
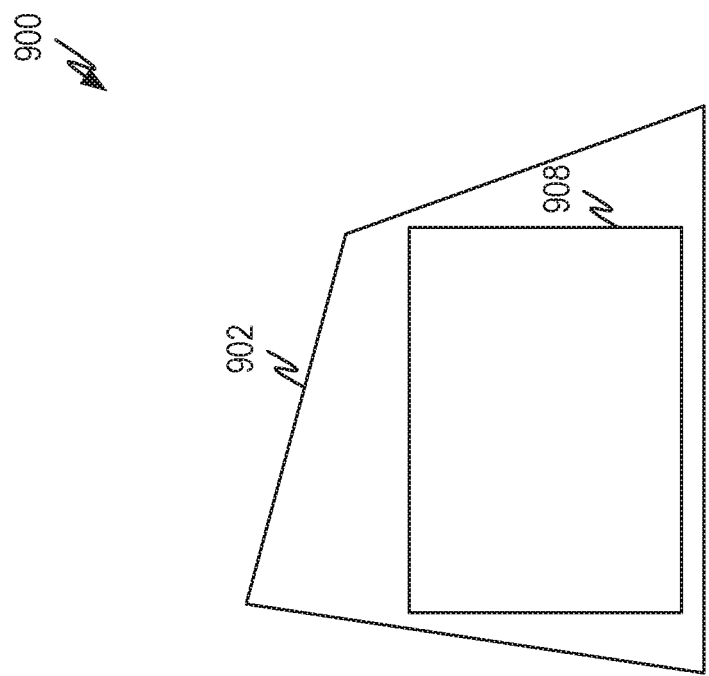
FIG. 9 illustrates an example for multi-axis display rotation according to some aspects of the present disclosure.
Figure 9:
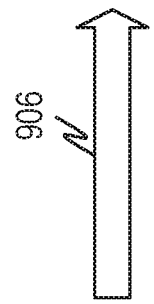
Figure 9:
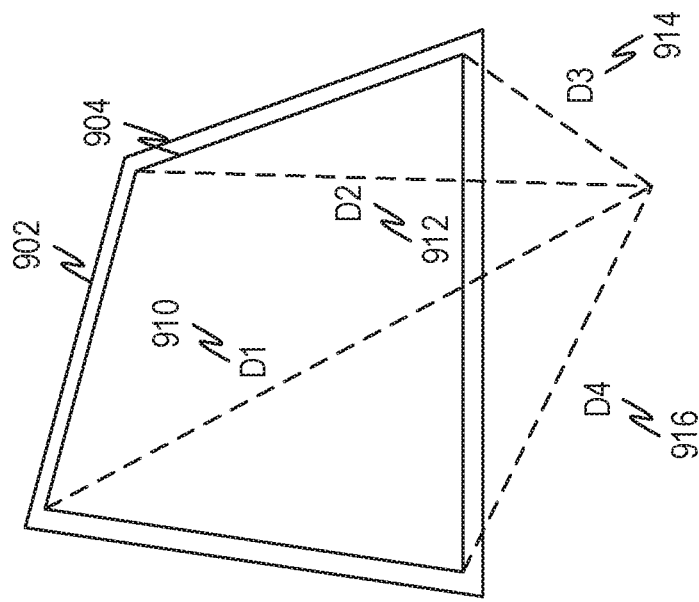

The examples presented above have illustrated correction for rotation around a single axis. Multi-axis rotation can be corrected by correcting one axis and then correcting the other. However, that is not the only approach to the problem. An approach can be taken that corrects for multi-axis rotation and scaling. FIG. 9 illustrates an example 900 for multi-axis display rotation according to some aspects of the present disclosure. A rectangular (or square) display will appear as a general quadrilateral when rotated about multiple axes. This is illustrated by display 902 of FIG. 9. Correcting the perspective of the displayed information can be characterized as transforming the information displayed in area 904 to the area of 908. The display area 904 would be a rectangle (or square as the case may be) if viewed at a normal angle. However, because the vertices of the display area 904 are all at different distances ($D_1$ 910, $D_2$ 912, $D_3$ 914, $D_4$ 916), the rectangular (or square as the case may be) display area appears as the general quadrilateral 904.

The perspective can be corrected to the display area 908 using a homography. When planar objects are imaged, or in this case viewed at a rotation around multiple axes, the images observed from multiple views are related by a linear projective transformation, referred to as a homography.

$$x'_i = \mathbb{H} x_i \quad (9)$$

$$\mathbb{H} = \begin{bmatrix} h_{11} & h_{12} & h_{13} \\ h_{21} & h_{22} & h_{23} \\ h_{31} & h_{31} & h_{33} \end{bmatrix} \quad (10)$$

Where $x'_i$ and $x_i$ are 3×1 vectors and correspond to images of the same point. The homography $\mathbb{H}$ is the transformation matrix of size 3×3. This is defined only up to a scaling and hence has only 8 unknowns. Given four corresponding points (8 equations) in a general position, $\mathbb{H}$ can be uniquely computed. Perspective rectification from 904 to 908 involves recovery of the frontal view of the image by determining the homography starting from an arbitrary view 904. Corresponding points in the two images (904, 908) are related by a linear transformation of the projective space. If $x'=[x', y']^T$ and $x=[x, y]^T$, the corresponding points in the two images are related by a homography and:

$$x' = \frac{h_{11}x + h_{12}y + h_{13}}{h_{31}x + h_{32}y + h_{33}} \quad (11)$$

$$y' = \frac{h_{21}x + h_{22}y + h_{23}}{h_{31}x + h_{32}y + h_{33}} \quad (12)$$

The frontal view of an image can be recovered only up to a uniform scale if we can compute the homography. Since there are 8 unknowns, a minimum of 8 equations are needed to compute the homography. These can be computed from the correspondences of four points. Thus, we take the four corners of the display 904 and the four corners of the corrected display area 908 as the four corresponding points. The value of $h_{33}$ is a scaling factor and can thus be set to 1. This leaves 8 unknowns. Using the four vertices of the bounding quadrilateral 904 and rectified area 908 as the four points, we have eight equations and eight unknowns and can solve for the homography and perform the rectification.

The method can be summarized as:
1) Identify the corners of the bounding quadrilateral in 904.
2) Identify the area 908 where the bounding quadrilateral 904 will be mapped.
3) Map each vertex of the quadrilateral 904 to the corresponding vertex in the identified area 908.
4) Using the equations of (11) and (12) along with the additional constraint that $\|h\|$ is of unit norm, find the corresponding coefficients $h_{ij}$ of the homography $\mathbb{H}$
5) Using $\mathbb{H}$ rectify the area 904 to the area 908.

Figure 10:
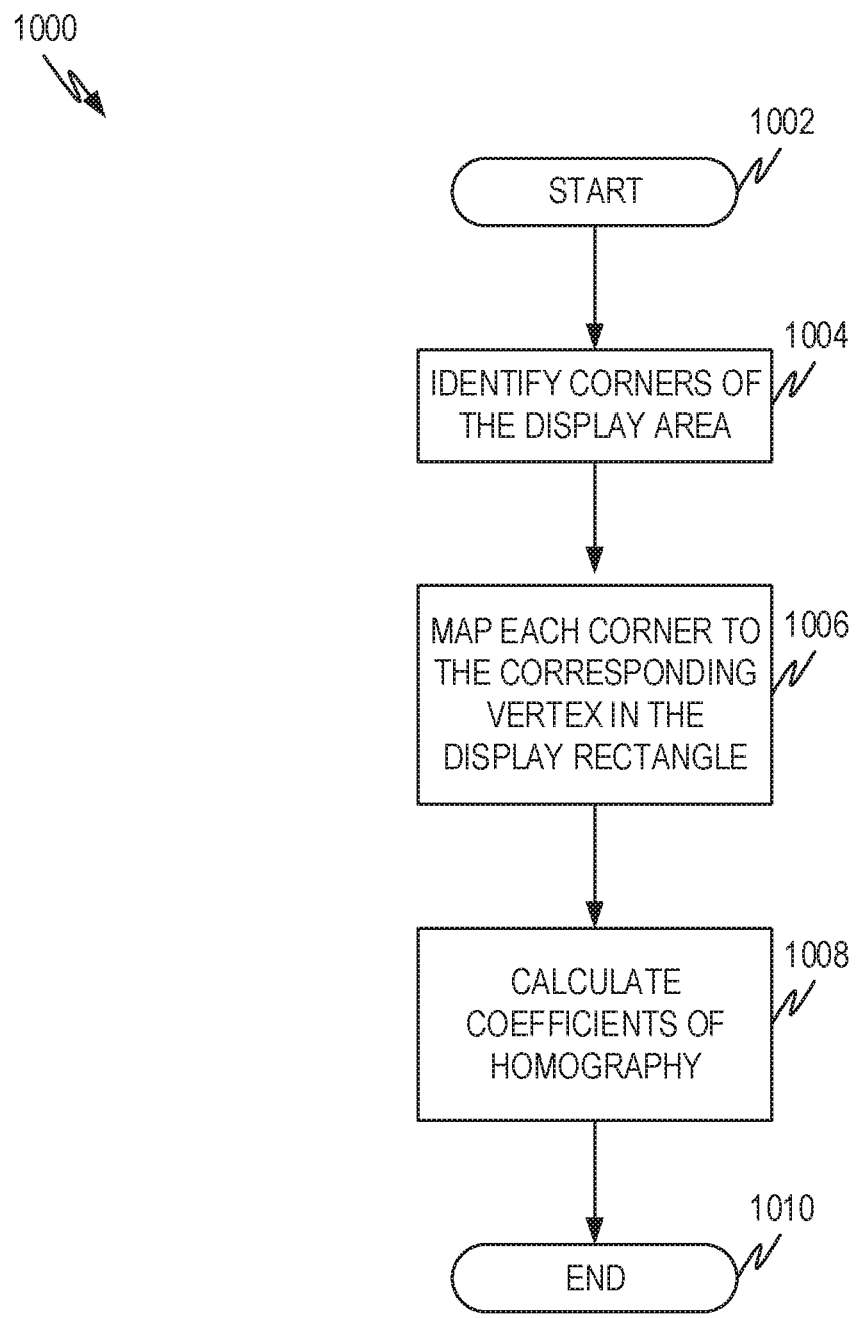
FIG. 10 illustrates an example method for calculating a homography according to some aspects of the present disclosure.
Figure 11:
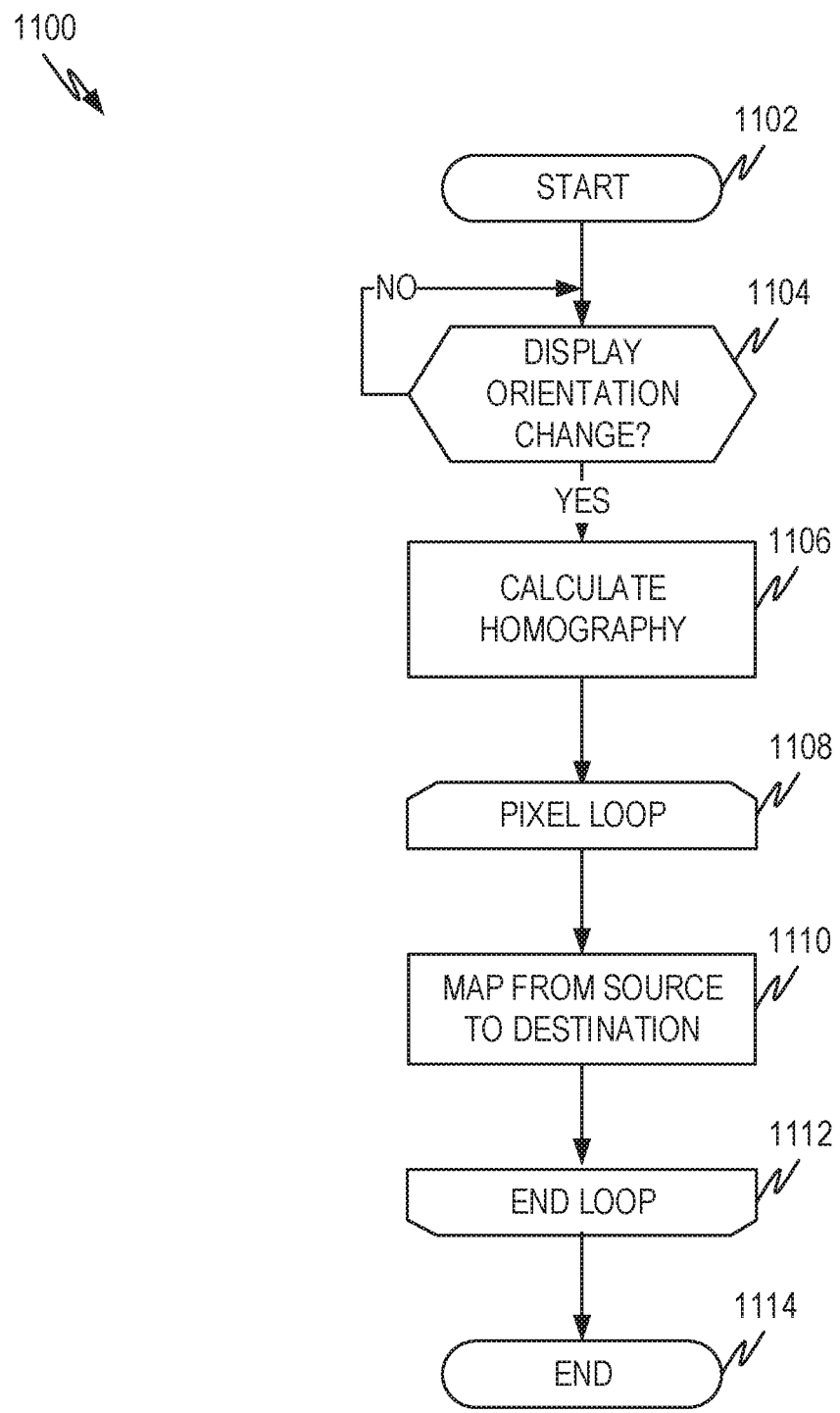
FIG. 11 illustrates an example method for display information correction according to some aspects of the present disclosure.

Operations 1-4 are discussed in FIG. 10 and operation 5 is discussed in FIG. 11.

FIG. 10 illustrates an example method 1000 for calculating a homography according to some aspects of the present disclosure. The method begins at operation 1002 and proceeds to operation 1004 where the corners of the quadrilateral 904 are identified. When identifying the corners of the quadrilateral 904, the coordinates of the bounding rectangle can be the screen coordinates of the corners of the quadrilateral 904.

Operation 1006 maps each corner to the corresponding vertex in the display rectangle 908. The bounding corners of the rectangle 908 are a bit more complicated to derive. The aspect ratio of the rectified quadrilateral 904 is known based on the screen coordinates of the bounding rectangle. This aspect ratio allows the corners of the rectangle 908 to be derived. When viewed from an angle normal to the screen 902, the quadrilateral 904 is a rectangle with the corners at the screen coordinates. The rectangle 908 becomes a quadrilateral similar to 904 when viewed at an angle normal to the screen. In order to identify the corners of the rectangle 908, the system identifies a quadrilateral that fits within the screen 902 and that when rectified will become the rectangle 908. This quadrilateral becomes the rectified rectangle 908 when multiplied by the homography and viewed from the user's gaze angle.

Operation 1008 then calculates the coefficients of the homography as discussed above.

FIG. 11 illustrates an example method for display information correction according to some aspects of the present disclosure. The method of FIG. 11 utilizes the homography that is calculated as shown above to rectify the area 904 to the area 908.

The method begins at operation 1102 and proceeds to operation 1104. At operation 1104, the system monitors changes in the set of parameters as described herein to detect changes in screen orientation. When changes in the orientation are detected, execution proceeds to operation 1106, which calculates the homography as discussed above.

Operation 1108 begins a loop that loops over all the pixels in the source quadrilateral (e.g., 904). Operation 1110 maps the source (e.g., 904) to the destination (e.g., 908) by calculating the new x-y coordinate pair using equations (11) and (12) above with the homography coefficients.

The loop ends at operation 1112 and the method ends at operation 1114.

Although the above is presented using rectangular displays as an example, the same principles with appropriate modification can be applied to displays of other shapes such as circles, ovals, spheres, and other non-right angle parallelogram shapes.

Example Machine Architecture and Machine-Readable Medium

Figure 12:
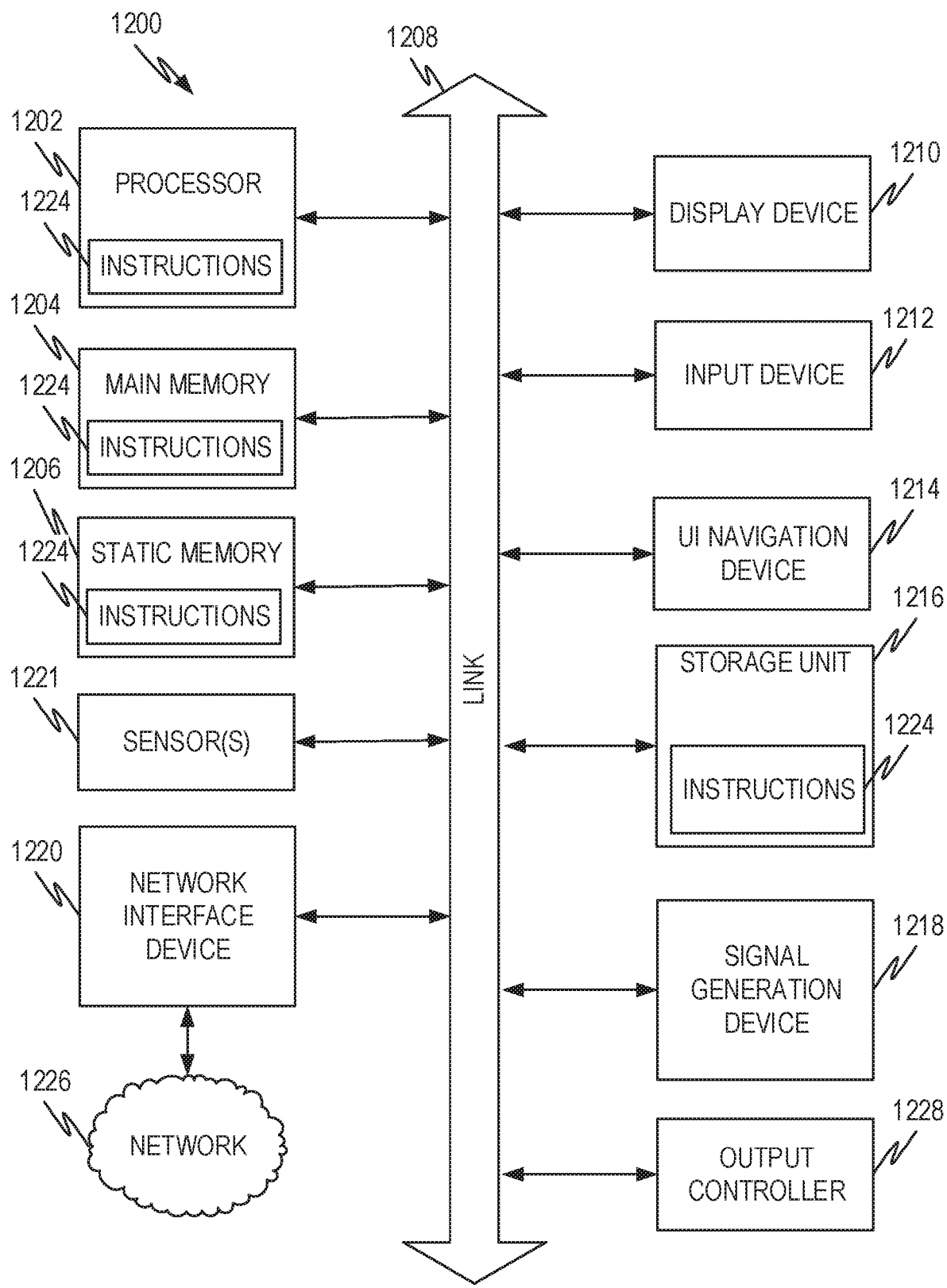
FIG. 12 illustrates a representative architecture for implementing the systems and other aspects disclosed herein or for executing the methods disclosed herein.

FIG. 12 illustrates a representative machine architecture suitable for implementing the systems and so forth or for executing the methods disclosed herein. The machine of FIG. 12 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 12 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 1200 includes at least one processor 1202 (e.g., a central processing unit (CPU), a graphics processing unit (GPU), advanced processing unit (APU), or combinations thereof), one or more memories such as a main memory 1204, a static memory 1206, or other types of memory, which communicate with each other via link 1208. Link 1208 may be a bus or other type of connection channel. The machine 1200 may include further optional aspects such as a graphics display unit 1210 comprising any type of display. The machine 1200 may also include other optional aspects such as an alphanumeric input device 1212 (e.g., a keyboard, touch screen, and so forth), a user interface (UI) navigation device 1214 (e.g., a mouse, trackball, touch device, and so forth), a storage unit 1216 (e.g., disk drive or other storage device(s)), a signal generation device 1218 (e.g., a speaker), sensor(s) 1221 (e.g., global positioning sensor, accelerometer(s), microphone(s), camera(s), and so forth), output controller 1228 (e.g., wired or wireless connection to connect and/or communicate with one or more other devices such as a universal serial bus (USB), near field communication (NFC), infrared (IR), serial/parallel bus, etc.), and a network interface device 1220 (e.g., wired and/or wireless) to connect to and/or communicate over one or more networks 1226.

Executable Instructions and Machine-Storage Medium

The various memories (i.e., 1204, 1206, and/or memory of the processor(s) 1202) and/or storage unit 1216 may store one or more sets of instructions and data structures (e.g., software) 1224 embodying or utilized by any one or more of the methodologies or functions described herein. These instructions, when executed by processor(s) 1202 cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include storage devices such as solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically and unequivocally excludes carrier waves, modulated data signals, and other such transitory media, at least some of which are covered under the term "signal medium" discussed below.

Signal Medium

The term "signal medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

EXAMPLE EMBODIMENTS

Example 1

A method for correction of displayed information, comprising:
 accessing one or more parameters defining an initial orientation of a display device, the initial orientation presenting information to a user in a manner to minimize perspective distortion within a threshold amount;
 detecting a change in orientation of the display device;
 determining a distance from a user's eye to a location on the display device;
 calculating a first correction factor based on the distance; and
 correcting perspective distortion of information displayed on the display device based on the first correction factor.

Example 2

The method of claim 1 further comprising:
 identifying at least two opposing edges of the display;
 wherein the correction factor is based on a distance between a first of the opposing edges and the user's eye;
 calculating a second correction factor based on a distance between a second of the opposing edges and the user's eye; and
 correcting displayed information based on the correction factor and the second correction factor.

Example 3

The method of claim 2 wherein the correction factor is a first scaling factor and the second correction factor is a second scaling factor, and where correcting displayed information comprises a proportional scaling factor between the first scaling factor and second scaling factor based on a second distance between the two opposing edges of the display.

Example 4

The method of claim 1, 2, or 3 further comprising:
 calculating a distance to the user's eye from each of four vertices corresponding to a display area on the display device; and
 selecting as the distance, a shortest distance from each of the four vertices and the user's eye.

Example 5

The method of claim 1 wherein the correction factor is a homography.

Example 6

The method of claim 1, 2, 3, 4, or 5 wherein the initial set of display parameters comprises a display angle measured relative to vertical.

Example 7

The method of claim 1, 2, 3, 4, 5, or 6 wherein the initial set of display parameters comprises a viewing angle of the user's eye.

Example 8

The method of claim 1, 2, 3, 4, 5, 6, or 7 further comprising:
prompting the user to place the display at an initial orientation where displayed information is presented to the user in a manner that minimizes perspective distortion within a threshold amount;
measuring the initial set of display parameters; and
storing the one or more parameters.

Example 9

The method of claim 1 wherein detecting the change is accomplished by performing operations comprising:
measuring a current value for at least one of the set of display parameters;
calculating a difference between the current value to a prior value; and
responsive to the difference transgressing a threshold, determining that the orientation has changed.

Example 10

The method of claim 1 wherein the correction factor is a scaling factor.

Example 11

The method of claim 1, 2, 3, 4, 5, 6, 7, 8, 9, or 10 further comprising accounting for display limits.

Example 12

The method of claim 11 wherein accounting for display limits comprises adjusting the correction factor.

Example 13

The method of claim 11 wherein accounting for display limits comprises adjusting the location on the screen where information is displayed.

Example 14

An apparatus comprising means to perform a method as claimed in any preceding claim.

Example 15

Machine-readable storage including machine-readable instructions, when executed, to implement a method or realize an apparatus as claimed in any preceding claim.

Example 16

A method for correction of displayed information, comprising:
accessing one or more parameters defining an initial orientation of a display device, the initial orientation presenting information to a user in a manner to minimize perspective distortion within a threshold amount;
detecting a change in orientation of the display device;
determining a distance from a user's eye to a location on the display device;
calculating a first correction factor based on the distance; and
correcting perspective distortion of information displayed on the display device based on the first correction factor.

Example 17

The method of claim 16 further comprising:
identifying at least two opposing edges of the display;
wherein the first correction factor is based on a distance between a first of the opposing edges and the user's eye;
calculating a second correction factor based on a distance between a second of the opposing edges and the user's eye; and
correcting displayed information based on the first correction factor and the second correction factor.

Example 18

The method of claim 17 wherein the first correction factor is a first scaling factor and the second correction factor is a second scaling factor, and where correcting displayed information comprises a proportional scaling factor between the first scaling factor and second scaling factor based on a second distance between the two opposing edges of the display.

Example 19

The method of claim 16 further comprising:
calculating a distance to the user's eye from each of four vertices corresponding to a display area on the display device; and
selecting as the distance, a shortest distance from each of the four vertices and the user's eye.

Example 20

The method of claim 18 wherein the first correction factor is a homography.

Example 21

The method of claim 16 wherein the one or more parameters comprise a display angle measured relative to vertical.

Example 22

The method of claim 16 wherein the one or more parameters comprises a viewing angle of the user's eye.

Example 23

The method of claim 16 further comprising:
prompting the user to place the display at the initial orientation;
measuring the one or more parameters; and
storing the one or more parameters.

Example 24

The method of claim 16 wherein detecting the change is accomplished by performing operations comprising:

measuring a current value for at least one of the one or more parameters;

calculating a difference between the current value to a prior value; and responsive to the difference transgressing a threshold, determining that the orientation has changed.

Example 25

The method of claim 16 wherein the first correction factor is a scaling factor.

Example 26

A system comprising a processor and computer executable instructions, that when executed by the processor, cause the system to perform operations comprising:

accessing an initial set of display parameters describing a display orientation presenting information to a user in a manner to minimize perspective distortion within a threshold amount;

comparing a second set of display parameters to the initial set of display parameters to detect changes in display orientation;

responsive to detecting changes in display orientation:

calculating a correction factor based on a distance between a display device and a user's eye;

identifying a region on the display where corrected display information will be displayed;

correcting displayed information based on the correction factor; and displaying the corrected display information in the identified region.

Example 27

The system of claim 26 further comprising:

identifying at least two opposing edges of the display;

wherein the correction factor is based on a distance between a first of the opposing edges and the user's eye;

calculating a second correction factor based on a distance between a second of the opposing edges and the user's eye; and correcting displayed information based on the correction factor and the second correction factor.

Example 28

The system of claim 26 further comprising:

calculating a distance to the user's eye from each of four vertices corresponding to a display area on the display device; and selecting as the distance, a shortest distance from each of the four vertices and the user's eye.

Example 29

The system of claim 28 wherein the correction factor is a homography.

Example 30

The system of claim 26 wherein the initial set of display parameters comprises a display angle measured relative to vertical.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A method for correction of displayed information, comprising:

accessing one or more parameters defining an initial orientation of a display device, the display device, when positioned at the initial orientation, presents information to a user in a manner to minimize perspective distortion within a threshold amount;

detecting a change in orientation of the display device;

identifying at least two opposing edges of the display device;

determining a first distance between a user's eye and a first of the opposing edges of the display device;

determining a second distance between the user's eye and a second of the opposing edges of the display device;

calculating a first correction factor based on the first distance;

calculating a second correction factor based on the second distance; and correcting perspective distortion of information displayed on the display device based on the first correction factor and the second correction factor.

2. The method of claim 1 wherein the first correction factor is a first scaling factor and the second correction factor is a second scaling factor, and where correcting displayed information comprises a proportional scaling factor between the first scaling factor and second scaling factor based on a second distance between the two opposing edges of the display.

3. The method of claim 2 wherein the first correction factor is a homography.

4. The method of claim 1 further comprising:

calculating a distance to the user's eye from each of two vertices corresponding to the first of the opposing edges; and selecting as the first distance, a shortest distance from each of the two vertices and the user's eye.

5. The method of claim 1 wherein the one or more parameters comprise a display angle measured relative to vertical.

6. The method of claim 1 wherein the one or more parameters comprises a viewing angle of the user's eye.

7. The method of claim 1 further comprising:

prompting the user to place the display at the initial orientation;

measuring the one or more parameters; and storing the one or more parameters.

8. The method of claim 1 wherein detecting the change is accomplished by performing operations comprising:

measuring a current value for at least one of the one or more parameters;

calculating a difference between the current value to a prior value; and responsive to the difference transgressing a threshold, determining that the orientation has changed.

9. The method of claim 1 wherein the first correction factor is a scaling factor.

10. The method of claim 1, wherein the display device is included within a laptop computing device that comprises a hinge and a base, wherein the display device is rotatable about the hinge relative to the base, and further wherein the hinge has a sensor coupled thereto that is configured to output a signal that is indicative of an amount of rotation of the display device relative to the base, the change in orientation is detected based upon the signal output by the sensor.

11. A system comprising a processor and computer executable instructions, that when executed by the processor, cause the system to perform operations comprising:
  accessing an initial set of display parameters describing a display orientation presenting information to a user in a manner to minimize perspective distortion within a threshold amount;
  comparing a second set of display parameters to the initial set of display parameters to detect changes in display orientation;
  responsive to detecting changes in display orientation:
    identifying two opposing edges of a display device;
    calculating a first correction factor based on a distance between a first of the two opposing edges and a user's eye;
    calculating a second correction factor based on a distance between a second of the two opposing edges and the user's eye;
    identifying a region on the display where corrected display information will be displayed;
    correcting displayed information based on the first correction factor and the second correction factor; and
    displaying the corrected display information in the identified region.

12. The system of claim 11, the operations further comprising:
  calculating a distance to the user's eye from each of two vertices corresponding to the first of the two opposing edges; and
  selecting as the distance, a shortest distance from each of the two vertices and the user's eye.

13. The system of claim 11 wherein the first correction factor is a homography.

14. The system of claim 11 wherein the initial set of display parameters comprises a display angle measured relative to vertical.

15. The system of claim 11 wherein the initial set of display parameters comprises a viewing angle of the user's eye.

16. The system of claim 11, the operations further comprising:
  prompting the user to place the display at an orientation where displayed information is presented to the user in a manner to minimize perspective distortion within a threshold amount;
  measuring the initial set of display parameters; and
  storing the initial set of display parameters.

17. The system of claim 11 being a laptop computing device that comprises a base, a hinge, and the display device, wherein the display device is rotatable relative to the base by way of the hinge, the laptop further comprising:
  a sensor that is configured to output a sensor signal that is indicative of an amount of rotation of the display device relative to the base, wherein the second set of display parameters is based upon the sensor signal output by the sensor.

18. A computer storage medium comprising executable instructions that, when executed by a processor of a machine, cause the machine to perform operations comprising:
  accessing an initial set of display parameters describing a display orientation presenting information to a user in a manner to minimize perspective distortion within a threshold amount;
  comparing a second set of display parameters to the initial set of display parameters to detect changes in display orientation;
  responsive to detecting changes in display orientation:
    calculating a correction factor based on a first distance between a first edge of a display device and a user's eye;
    calculating a second correction factor based on a second distance between a second edge of the display device and the user's eye, wherein the second edge opposes the first edge;
    identifying a region on the display where corrected display information will be displayed;
    correcting displayed information based on the first correction factor and the second correction factor; and
    displaying the corrected display information in the identified region.

19. The computer storage medium of claim 18 wherein the first correction factor is a scaling factor.

20. The computer storage medium of claim 18 wherein the first correction factor is a homography.

* * * * *